United States Patent [19]

Itou et al.

[11] Patent Number: 5,264,844
[45] Date of Patent: Nov. 23, 1993

[54] APPARATUS FOR DETECTING ROTATIONAL ANGULAR POSITION FOR INTERNAL COMBUSTION ENGINE

[75] Inventors: Masayuki Itou; Hidehito Mori, both of Anjo, Japan

[73] Assignee: Nippondenso Co., Ltd., Kariya, Japan

[21] Appl. No.: 939,595

[22] Filed: Sep. 2, 1992

[30] Foreign Application Priority Data

Sep. 6, 1991 [JP] Japan .................................. 3-226919
Sep. 18, 1991 [JP] Japan .................................. 3-237939

[51] Int. Cl.⁵ ............................................ H03M 1/30
[52] U.S. Cl. ............................................ 341/11; 341/6
[58] Field of Search ..................... 341/6, 1, 7, 9, 10, 341/11, 13; 318/600, 603

[56] References Cited

U.S. PATENT DOCUMENTS

3,967,271  6/1976  Day ............................................ 341/6
4,233,592  11/1980  Leichle .

OTHER PUBLICATIONS

Journal of Nippondenso Technical Disclosure No. 78-070 (dated May 15, 1991).
Journal of Nippondenso Technical Disclosure No. 78-069 (dated May 15, 1991).
Journal of Nippondenso Technical Disclosure No. 78-071 (dated May 15, 1991).

*Primary Examiner*—Marc S. Hoff
*Assistant Examiner*—Brian K. Young
*Attorney, Agent, or Firm*—Cushman, Darby & Cushman

[57] ABSTRACT

An apparatus for detecting the angular position for an internal combustion engine is capable of accurately detecting the angular position by a simple structure without being influenced by changes in the period of angular position signals due to inaccuracy of rotor contour and a change in rotational speed. Up-down counters up and down count clock pulses in response to the pulse train from a rotation sensor for determining information on unequal interval corresponding to a reference position in the pulse train. The frequency of the angular position is divided by a frequency dividing circuit. Up-down counting of clock pulses by the first and second up-down counters is terminated within two periods of the angular position signal. The outputs of the first and second up-down counters are alternatively up counted and down counted every one period of the angular position signal to determine the reference angular position based upon any one of determination outputs from up-down counters.

10 Claims, 5 Drawing Sheets

APPARATUS FOR DETECTING ROTATIONAL ANGULAR POSITION FOR INTERNAL COMBUSTION ENGINE

BACKGROUND OF THE INVENTION

The present invention relates to a rotational angular position detecting apparatus and in particular to an apparatus for detecting the angular position which is used for controlling an internal combustion engine of an automobile.

One of such apparatuses includes a rotor having equally spaced teeth (for example, at every 10° C. A) along the periphery thereof, which is mounted on a cam shaft or a crank shaft and a rotation sensor including an electromagnetic pickup or Hall effect element facing to said rotor for generating angular position signals representative of the angular position of the crank shaft or cam shaft, having a duty ratio of the high level to the lower level being one to one for detecting a reference angular position (e.g., top dead center) of said shaft, the angular position signals being generated corresponding to tooth or teeth-removed portions on the periphery of the rotor. Such an apparatus has been disclosed in, for example, U.S. Pat. No. 4,233,592. In this apparatus, clock pulses having a repetition frequency f are up counted and down counted at a frequency which is half of the frequency f by a single up-down counter in correspondence with the tooth-removed and toothed portions, thereby detecting the reference position respectively by detecting the ratio of the previous period $T(i-1)$ and the current period Ti which satisfies the relation $Ti/T(i-1) > K$.

However, since the output of the up-down counter is up and down counted by using the rotation sensor which generates angular position signals in which the ratio of the high level to the lower level is one to one when the angular position signal is in the high and low levels, respectively for determining the reference position, in the above mentioned prior art apparatus, the accuracy of the fall position of the angular position signal as well as the rise-up position gives an adverse influence upon the determination of the reference position. Accordingly, it is difficult to determine the reference position at a high accuracy since manufacturing of a rotor which is excellent in accuracy of both rise-up and fall positions of the angular position signal. It is impossible to keep the ratio of the high level to the low level one to one over an entire range of the rotational number of the engine since the output signal from the electromagnetic pick-up increases as the rotational number of the internal combustion engine increases particularly in the case where the electromagnetic pick-up is used as a rotation sensor. A problem such as wrong or impossible detection of the reference position may arise in some cases.

SUMMARY OF THE INVENTION

It is an object of the present invention to provide an apparatus which is capable of detecting a reference angular position in which angular position signals are generated unequally spaced from equally spaced angular position signals generated by a rotation sensor.

It is another object of the present invention to preset a determination value K to a value having a decimal number by a comparatively simple structure In an aspect of the present invention, there is provided an apparatus for detecting the angular position of an internal combustion engine, comprising:

an angular position signal generator for generating a pulse train of angular position signals having equal periods, each period comprising high and low levels in which the periods of the signals of the pulse train corresponding to the reference position have unequal intervals;

a first up-down counter for up and down counting clock pulses in response to the angular position signals from said generator to determine the unequal interval period among the angular position signals from the generator by comparing the time ratio of the previous period to the current period with a given value K;

a second up-down counter for up and down counting clock pulses at the phase difference which is one period of said angular position signal with respect to said first up-down counter to determine an equal interval period among the angular position signals from the generator by comparing the time ratio of the previous period to the current period with a given value K;

a reference position signal output circuit for outputting a reference position signal when at least one of said first and second up-down counters determines said period having unequal interval; and a f/K frequency dividing circuit for generating a down count clock for said up-down counters in which frequency dividing clocks f/2 and f/3 which are obtained by dividing the up count clock for each up-down counter by 2 and 3 are alternatively repeated n times and (N−n) times, respectively, wherein n and N are integers which satisfy the relation $\{2n + 3(N-n)\}/N = K$.

An angular position signal generator generates a pulse train comprising angular position signals having equal periods, each period comprising high and low level signals in synchronization with the rotation of a crank shaft or a cam shaft in an internal combustion engine and generates an angular position signal having unequal intervals corresponding to the reference angular position of the angular signals having equal periods of the pulse train.

Clock pulses are up and down counted by a first up-down counter every one period of the angular position signal in response to the angular position signal generated from the generator. A period having unequal interval is determined from the angular position signals by comparing the time ratio of the previous period to the current period with a given value K. The clock pulses are up and down counted by a second up-down counter at the phase difference which is one period of the angular position signal with aspect to the first up-down counter. A period having an unequal interval is determined from the angular position signals generated by the generator by comparing the time ratio of the previous period to the current period with a given value K. When one of the first and second up-down counters determines the period having an unequal interval, a reference position signal is outputted from a reference signal output circuit. Accordingly, there is an advantage in that wrong detection of the reference position due to inaccuracy of the rotor contour and change in signal period caused by irregular rotation can be positively prevented by a simple structure.

DESCRIPTION OF THE PREFERRED EMBODIMENTS

Figure 1:
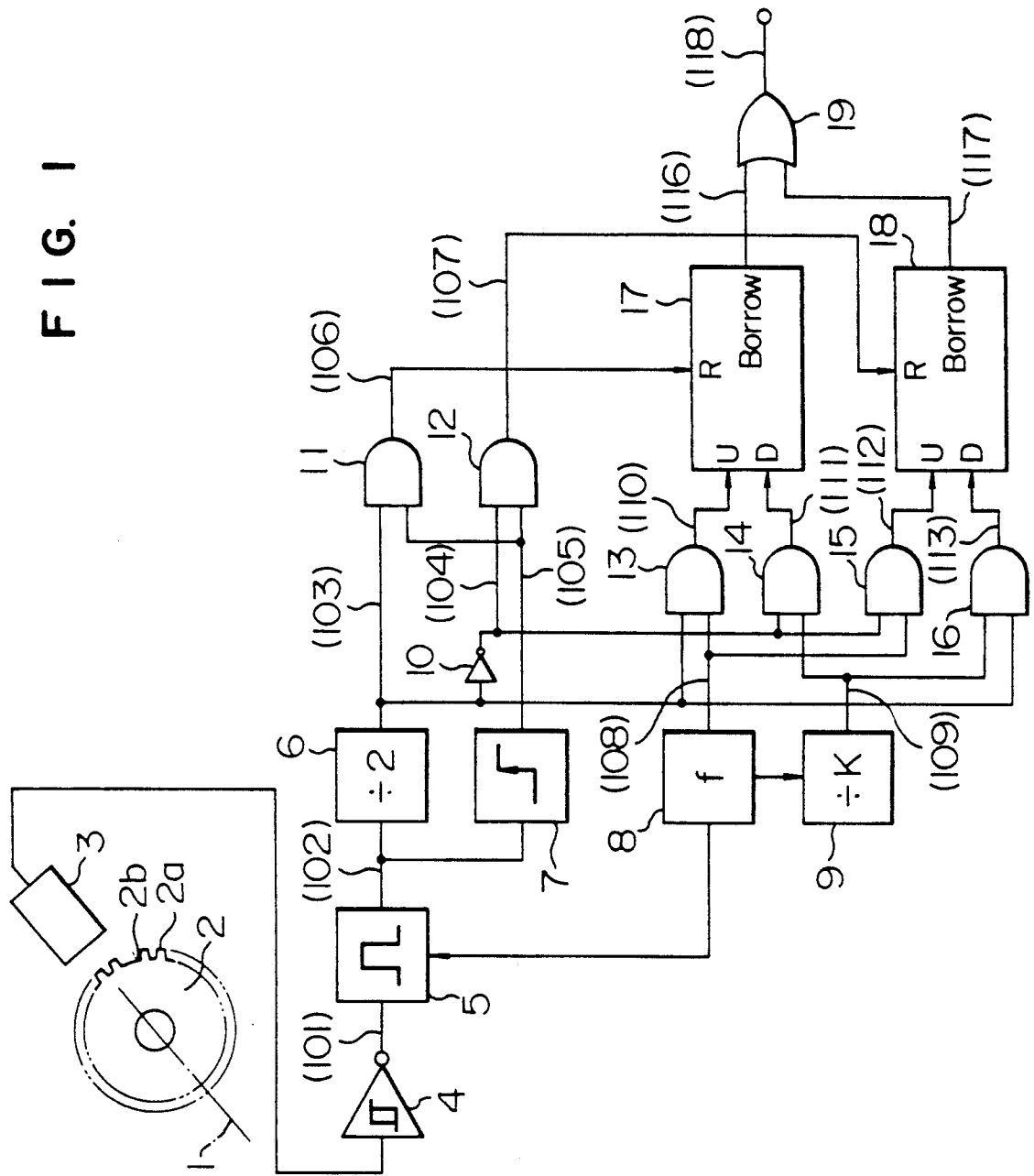
FIG. 1 is a schematic circuit diagram showing an embodiment of an angular position detecting apparatus of the present invention.

Referring now to FIG. 1, a rotor 2 which is mounted on a crank shaft or a cam shaft 1 of an internal combustion engine (not shown) is formed along the outer periphery thereof with 34 teeth 2a which are equally spaced from each other at 10° crank angle (CA) and a teeth removed portion 2b in which the consecutive teeth are removed. A rotation sensor 3 comprises an electromagnetic pick up which faces teeth 2a of the rotor. The pick up may be a Hall effect sensor or an optical sensor. A wave-form shaping circuit 4 shapes an output signal from the rotation sensor 1 into a rectangular wave for generating an angular signal. These components constitute an angular signal generator.

A sampling circuit 5 samples the rectangular pulses from the wave-form shaping circuit 4 in response to a reference clock having a frequency f supplied from an oscillation circuit 8 which will be described hereinafter. An angular position signal frequency dividing circuit divides the frequency of the sampled rectangular pulse. A rise-up edge detecting circuit 7 comprising a monostable multivibrator or flip-flop and the like generates a pulse for a given period of time after the rise-up of the rectangular signal.

An oscillation circuit 8 generates a reference clock. The frequency f of the reference clock is preset so that the frequency f is sufficiently higher than that of the rectangular pulse. A 1/K frequency dividing circuit converts the reference clock into a pulse having a frequency of f/K wherein K corresponds to a reference value for determining the above-mentioned teeth removed portion 2b from the teeth 2a of the rotor 2. A reference numeral 10 denotes an inverter and 11 through 16 denote similar AND gates.

First and second up-down counters 17 and 18 have identical functions. In this embodiment they perform up counting and down counting when a clock is input to their "U" and "D" terminals respectively, and are capable of resetting the count to "0" when a high level signal is input to their "R" terminal and are capable of outputting a high level signal from their "BORROW" terminals when the count becomes a negative value (the up count value < the down count value).

A reference signal output circuit 19 comprising an OR gate performs a logical OR operation on the outputs from the "BORROW" terminals of the first and second up-down counters 17 and 18.

Now, operation of the thus formed angular position detecting apparatus will be described with reference to a timing chart of FIG. 2. The rotation sensor 3 which is mounted in the vicinity of the rotor 2 generates an electrical signal upon the rotation of the rotor 2. The output signal from the rotation sensor 3 is converted into a rectangular pulse by the wave-form shaping circuit 4. The rectangular output pulse corresponds one-to-one to the signal input to the wave-form shaping circuit 4 so that a given angular position of the shaft 1 is represented by the rise-up edge of each pulse.

Figure 2:
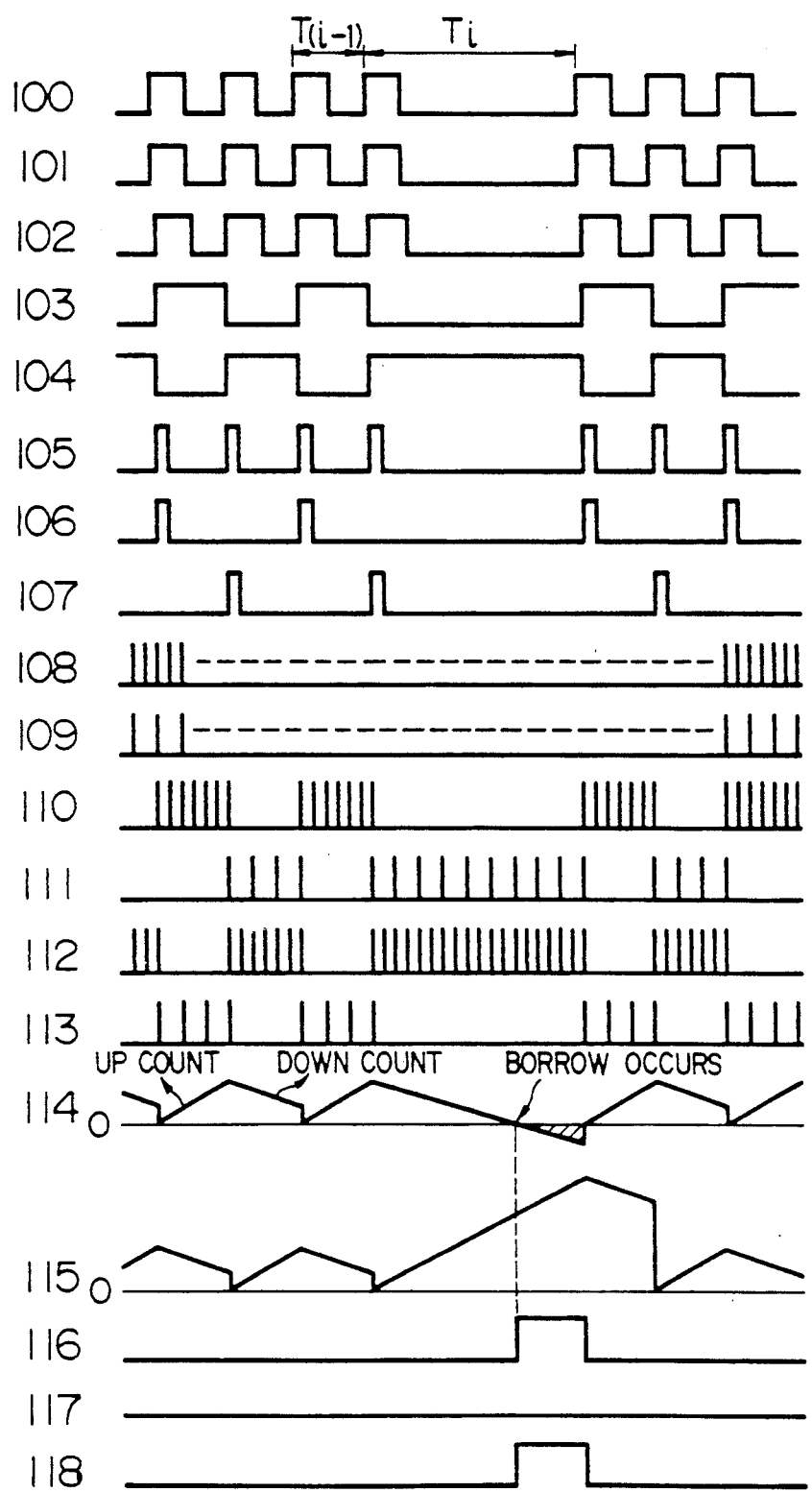
FIG. 2 is a timing chart of waveforms explaining the operation of the apparatus of FIG. 1.

A waveform 100 in FIG. 2 shows the developed contour of the teeth of the rotor 2. In order to generate a signal of of representative of the reference angular position of the shaft 1, the rotor 2 is provided with a teeth removed portion 2b (teeth 2a are eliminated) at the reference angular position thereof. If the pitch of the teeth 2a on the periphery other than the reference position and the pitch of the teeth removed portion 2b at the reference position are represented as $T(i-1)$ and $T_i$, respectively, the pitches T and $T_i$ are preset so that $T_i/T(i-1) > K$ wherein K is a removed teeth determination value $K > 1$.

The rectangular pulse which is generated by the rotation of the rotor 2 is output from the waveform shaping circuit 4 and is represented as 101 in FIG. 2. This signal is input to the sampling circuit 5 by which it is sampled in response to the clock having a frequency f supplied from the oscillating circuit 8 to become a signal (102 in FIG. 2) which is synchronized with this clock. The frequency f is preset sufficiently higher than the frequency of the signal 101 and is high value to reproduce the signal 101 after sampling.

A signal (103 in FIG. 2) is obtained by dividing the frequency of the signal 102 by 2 by the angular signal frequency-dividing circuit 6, and a signal (105 in FIG. 2), is obtained by detecting the rise-up edge by the rise-up edge detecting circuit 7, which are both then applied to an AND gate 11 in which a logical product operation is performed. An output signal from the AND gate 11 (106 in FIG. 2) is input to an "R" terminal of the first up-down counter 17. Similarly, a signal (104 in FIG. 2) which is obtained by inverting the phase of the signal, 103 by the inverter 10 and a signal 105 are input to an AND gate 12 in which a logical product operation is performed for both signals and an output signal (107 in FIG. 2) from the AND gate 12 is input to the "R" terminal of the second up-down counter 18. In other words, each of the first and second counters 17 and 18 are reset every two periods of the angular signal 102 and in response to the phase difference which is one period.

Now, functions of the first and second up-down counters 17 and 18 will be described. Timing of clocks to the first and second up-down counters 17 and 18 are shown as 110 to 113 in FIG. 2. Signals 110 through 113 are an upcount clock to the first up-down counter 17, a down count clock to the first up-down counter 17, an up count clock to the second up-down counter 18 and a down count clock to the second up-down counter 18, respectively.

Through the operation of the AND gates 13 to 16, a clock (108 in FIG. 2) having a frequency f is supplied from the oscillation circuit 8 to the up counters and a clock (109 in FIG. 2), the frequency of which is divided into a frequency of f/K by the 1/K frequency dividing circuit 9, is supplied to the down-counters. Accordingly, considering the operation of the counters as well as the above mentioned reset signal, the first and second up-down counters 17 and 18 perform up-counting for one period of the angular signal at the clock of a frequency f and then performs down-counting for the next one period and are reset immediately after completion of down-counting so that the count is reset to 0.

Operation of the above mentioned AND gates 13 to 16 enable the first and second up-down counters 17 and 18 to perform the above mentioned operation at the phase difference which is one period of the angular position signal 102. In other words, the first up-down counter 17 performs up counting while the second up-down counter 18 performs down counting (114 and 115 in FIG. 2). The numbers of clock cycles inputted to the first and second up-down counters 17 and 18 during the same period of time are such that up count greater than down count is always established when the teeth 2a of the rotor 2 have the same pitch since the up count is K times as high as the down count. Therefore, the count after completion of down counting never becomes a negative value. No signal is inputted to both up-down counters 17 and 18 via the "BORROW" terminals.

Since the above mentioned relation $Ti/T(i-1) > K$ is established at the teeth removed portion of the rotor 2, any one of the up-down counters 17 and 18 counts down at the teeth removed portion, the down count being higher than the up count which is counted immediately before the teeth removed portion In other words, since the count assumes a negative value, a signal is output from the "BORROW" terminal of the up-down counter at this time (116 in FIG. 2). Since the teeth removed portion 2b is positioned at the reference position of the rotor 2 as mentioned above, detection of the reference position can be achieved from the signal 116.

The reason why two up-down counters 17 and 18 are used will be described as follows: In order to detect the teeth removed portion 2b, it is necessary for the up-down counter to perform the down counting at the teeth removed portion 2b. However, the position of the teeth 2a of the rotor 2 is unstable in the initial state. In other words, the number of the teeth passing through the sensor until the teeth removed portion 2b reaches the sensor is indefinite. Since up counting is started with an up counter, down counting is not necessarily performed at the teeth removed portion if a single counter is used. The teeth removed portion may not be detected. However, the teeth removed portion can be positively detected with two up-down counters since down counting is surely performed by any of the up-down counters at the teeth removed portion in accordance with the method of the present embodiment.

Since the ratio of the periods corresponding to the teeth removed portion and the teeth having equal pitch is measured in the present embodiment, the problems of the prior art, the possibility of wrong detection of the teeth removed portion due to changes in the period of signal caused by the inaccuracy of the contour of the rotor 2 (the ratio of concaves to convexes) and the change in induced voltage by irregular rotations, can be reduced. Detection of the teeth removed portion can be positively achieved by provision of two up-down counter systems.

Figure 3:
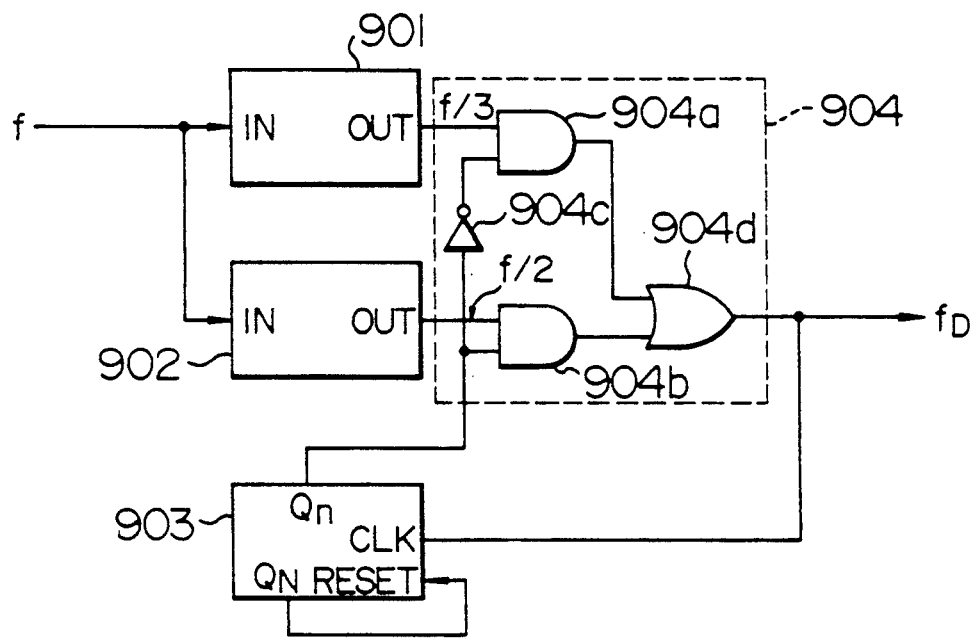
FIG. 3 is a detailed circuit diagram showing a 1/k frequency dividing circuit in the apparatus of FIG. 1.

Now, the 1/K frequency dividing circuit 9 will be described in detail with reference to FIG. 3. A ⅓ frequency dividing circuit 901 divides the frequency f of the signal of the oscillation circuit 8 into f/3. A ½ frequency dividing circuit 902 divides the frequency f of the signal of the oscillation circuit 8 into f/2. A counter circuit 903 counts a clock signal input to a clock terminal. A clock switching circuit 904 comprises AND circuits 904a, 904b, an inverter 904c and an OR circuit 904d.

Figure 4:
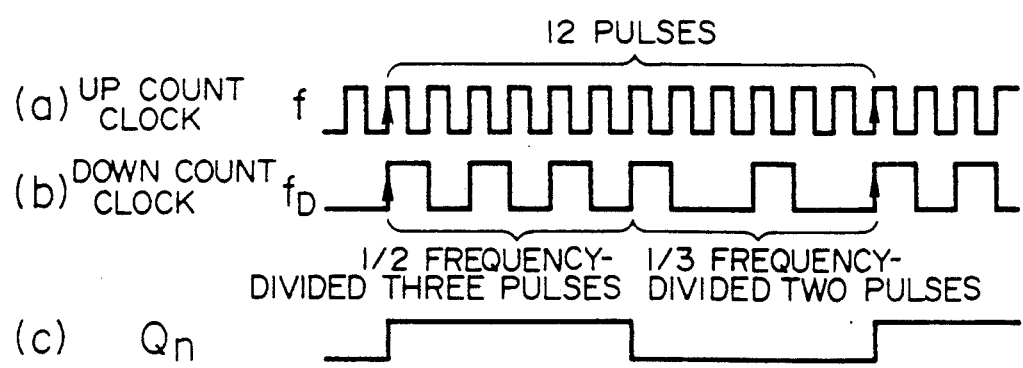
FIG. 4 is a timing chart explaining the operation of the apparatus of FIG. 3.

Operation of the thus formed 1/K frequency dividing circuit will be described with reference to a timing chart in FIG. 4. An up count clock having a frequency f as represented as (a) in FIG. 4 is inputted from the oscillation circuit 8 to the ⅓ frequency dividing circuit 901 and the ½ frequency dividing circuit 902. The respective outputs having the frequencies f/3 and f/2 from the ⅓ and ½ frequency dividing circuits 901 and 902 are inputted to the clock switching circuit 904 for providing a down count clock fn as represented as (b) in FIG. 4. The clock switching circuit 904 is controlled in response to an output Qn of the counter circuit 903. When the output Qn is in the 1 and or level, an outputs having a frequency of f/2 and f/3 is outputted from the clock switching circuit 904, respectively.

The counter circuit 903 is formed so that it counts the down count clock fd and generates 1 level signal on the Qn output since the count is reset to zero until it becomes "n−1" and generates a 0 level signal on the Qn output while the count is n to N−1. The determination value K is determined in accordance with the following formula $$\{2 \times n + 3 \times (N-n)\}/N = K$$

wherein n and N are integers.

Therefore, it suffices to preset n and N with integers so that the following relation is satisfied in case of K=2.4

$$\{2 \times n + 3 \times (N-n)\}/N = 2.4$$

In other words, it suffices to preset n=3, N=5 and to variably preset n as any one of 5, 4, 3, 2, 1, 0 in order to obtain K=2.0, K=2.2, K=2.4, K=2.6, K=2.8, K=3.0 (It is of course sufficient to fixedly preset n as any one of 5, 4, 3, 2, 1, 0 if it is not necessary to variably preset n). In order to obtain K=2.1, it sufficient to preset n=9 and N=10. In order to variably preset K from 2.0 to 3.0 at intervals of 0.1 in a stepwise manner, it sufficient to fixedly preset N=10 and variably preset n to any one of 9 to 0.

Figure 5:
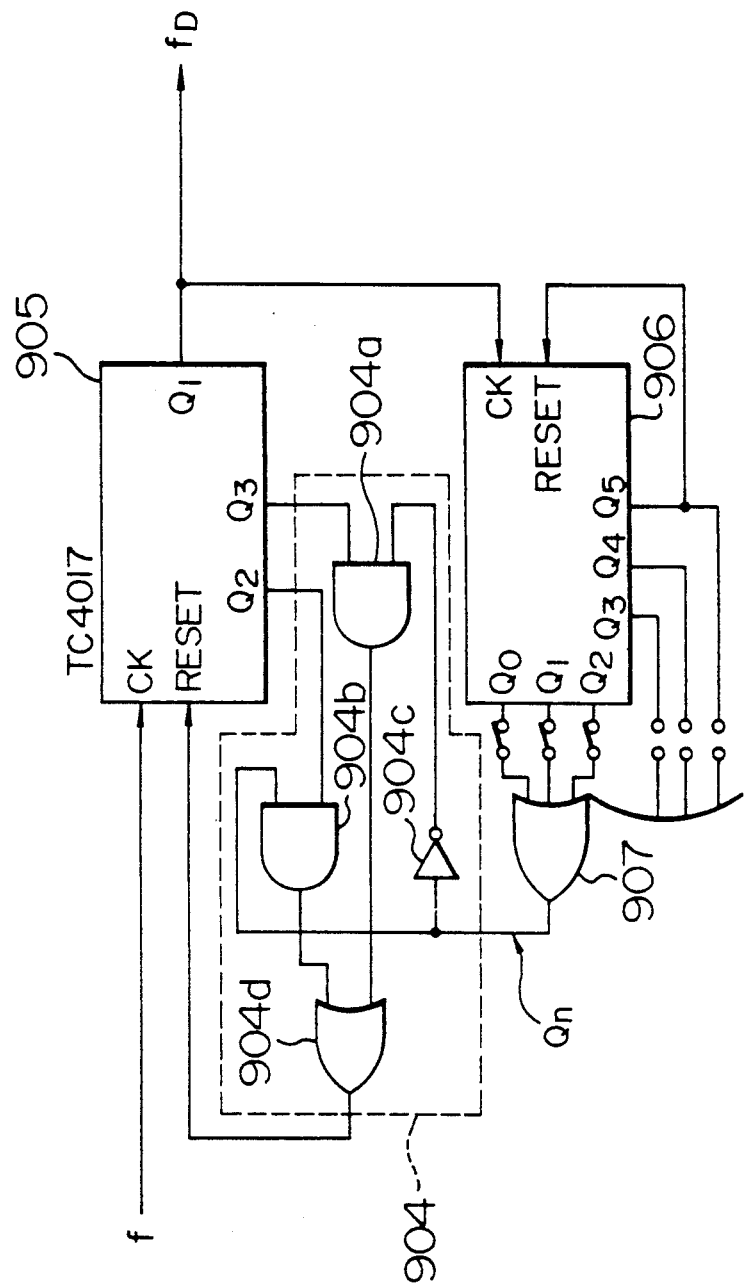
FIG. 5 is a detailed circuit diagram showing another 1/k frequency dividing circuit in the apparatus in FIG. 1.
Figure 6:
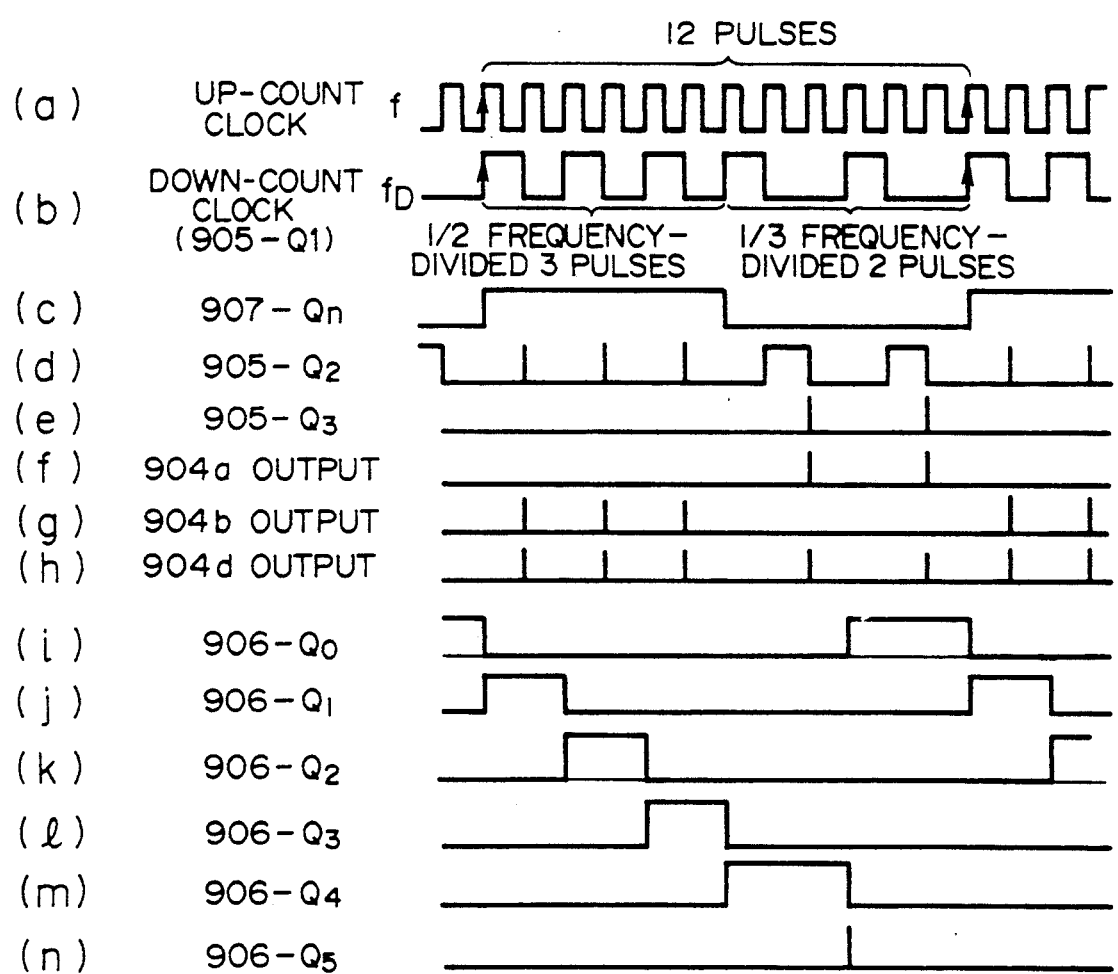
FIG. 6 is a timing chart of waveforms at circuit portions of FIG. 5.

FIG. 5 shows another example of the 1/K frequency dividing circuit 6 for obtaining K=2.4. Counter circuits 905 and 906 are formed so that 1 level signal is generated on a $Q_0$ output when a signal is applied to their zero reset terminals RESET and 1 level signal is consecutively shifted in order of $Q_1$, $Q_2$, $Q_3$, $Q_4$ and $Q_5$ every time a clock signal is applied to its clock terminal CK. An up count clock f is applied to the clock input CK of the counter circuit 905. The outputs $Q_2$ and $Q_3$ of the counter circuit 905 are connected to either inputs of AND circuits 904a and 904b of the clock switching circuit 904, respectively. The output of an OR circuit 904d of the clock switching circuit 904 is connected to the reset input RESET of the counter circuit 905. Outputs which are obtained by dividing the frequency of the up count clock f partially by 2 and 3 are generated on the $Q_2$ and $Q_3$ outputs of the counter circuit 905, respectively. A down count output having a frequency f/K is generated on the $Q_1$ output. The outputs $Q_0$, $Q_1$ and $Q_2$ of the counter circuit 906 are connected with three inputs of a 6 input OR circuit 907. The output $Q_5$ of the counter circuit 906 is connected with the zero reset input RESET of the counter circuit 906. The output of the OR circuit 907 is connected with the other input of the AND circuit and the input of an inverter 904C. The OR circuit 907 and the counter circuit 906 perform the function of the counter circuit 903 in FIG. 3. FIG. 6 shows signal waveforms at circuit portions of FIG. 5. The circuit of FIG. 5 can generate 1/K frequency-divided down-count output pulse identical to that of the FIG. 3 circuit.

The outputs $Q_3$, $Q_4$ and $Q_5$ of the counter circuit 906 may be connected with the remaining three inputs of the 6 input OR circuit 907. By properly selecting the connection between the outputs $Q_0$ to $Q_5$ of the counter circuit 906 and the 6 inputs of the 6 input OR circuit 907, it is possible to fixedly preset N=5 and to variably preset n as any one of 5, 4, 3, 2, 1, 0. This makes it possible to properly select K as any one of 2.0, 2.2, 2.4, 2.6, 2.8 and 3.0.

Although the ½ frequency dividing circuit is used as an angular position signal frequency dividing circuit 6 in the above mentioned embodiments, a 1/n (n is an integer more than 2) frequency dividing circuit may be used if the angular pitch for generating the angular position signal is preset finer.

As mentioned above, in accordance with the present invention the rotational signal generator generates a pulse train comprising angular position signals having equal periods, each period comprising high and low level signals in synchronization with the rotation of a crank shaft in an internal combustion engine and generates an angular position signal having unequal intervals, corresponding to the reference angular position of the angular signals having equal periods of the pulse train.

Clock pulses are up and down counted by a first up-down counter every one period of the angular position signal in response to the angular position signal generated from the generator. A period having an unequal interval is determined from the angular position signals by comparing the time ratio of the previous period to the current period with a given value K. The clock pulses are up and down counted by a second up-down counter at the phase difference which is one period of the angular position signal with respect to the first up-down counter. A period having an unequal interval is determined from the angular position signals generated by the generator by comparing the time ratio of the previous period to the current period with a given value K. When one of the first or second up-down counters determines the period having unequal interval, a reference position signal is outputted from a reference signal output circuit. Accordingly, there is an advantage in that wrong detection of the reference position due to inaccuracy of the rotor contour and change in signal period caused by irregular rotation can be positively prevented by a simple structure.

What is claimed is:

1. An apparatus for detecting the angular position of an internal combustion engine, comprising:
    an angular position signal generator for generating a pulse train of angular position signals having equal periods except an unequal interval period corresponding to a reference angular position, with each period comprising high and low levels of signal;
    a first up-down counter for up and down counting first and second clock pulses respectively and alternately in response to the angular position signals from said generator to detect the unequal interval period among the angular position signals from the generator by comparing a time ratio of a previous period to a current period with a given value K;
    a second up-down counter for up and down counting said first and second clock pulses respectively and alternately in response to the angular position signals from said generator to detect the unequal interval period among the angular position signals from the generator by comparing a time ratio of a previous period to a current period with a given value K;
    a reference angular position signal output circuit for outputting a reference angular position signal when at least one of said first and second up-down counters detects said period having unequal interval; and
    an f/K frequency dividing circuit for generating said second down count clock pulses for said first and second up-down counters in which frequency-divided clocks f/2 and f/3 are obtained by frequency division of said first up-down counter first clock pulse f, said second down count clock pulses comprises of said frequency-divided clocks f/2 and f/3 alternatively repeated n times and (N−n) times, respectively, wherein n and N are integers which satisfy the relation {2n+3(N−n)}/N=K.

2. An apparatus as defined in claim 1, further including means for sampling the angular position signals at a frequency sufficiently higher than that of the angular position signals from signal generator, wherein said first and second up-down counters up and down count said first and second clock pulses in response to the sampled angular position signals.

3. An apparatus as defined in claim 1 in which said f/K frequency dividing circuit further comprises:
    means for dividing the frequency f of the first clock pulse clock by 2 to generate a clock having a frequency of f/2;
    means for dividing the frequency f of the first clock pulse clock by 3 to generate a clock having a frequency f/3;
    clock selecting means connected with said f/2 and said f/3 clocks for alternatively selecting between said f/2 and said f/3 clocks; and
    means for controlling said clock selecting means in response to the second clock pulse clock to generate a down count clock have frequencies f/2 and f/3 by means of said clock selecting means while (n−1) and (N−1) said second clock pulse clocks are counted, respectively; said means for controlling being reset by N down count clocks.

4. An apparatus as defined in claim 1 in which said f/K frequency dividing circuit further comprises;
    a first counting circuit for consecutively generating first to third output pulse signals in response to a given number of up count clocks f;
    a second count circuit for consecutively generating and resetting a plurality of groups of output signals in response to a given number of said first output pulse signals which forms f/K down count clock;
    an OR means for selecting a logical sum of output signals of a predetermined group of said plurality of groups; and
    signal switching means for resetting said first counting circuit in response to the second output of said first counting circuit and the output signal of said OR means and for resetting said first count circuit in response to the third output signal of said first count circuit and an inverted output of an output signal of said OR means.

5. An apparatus as defined in claim 4, wherein said OR means includes means for selecting any other group of output signals among said plurality of groups in lieu of said predetermined group to output the logical sum.

6. An apparatus for detecting a rotational angular position for an internal combustion engine, comprising:

an angular position signal generator for generating a pulse train of angular position signals having equal periods, each period comprising high and low levels in which an unequal interval in the periods of the signals of the pulse train corresponds to a reference angular position;

an angular position signal frequency dividing circuit for dividing the frequency of the angular position signal by n, which is an integer more than 1, in order to produce a frequency division output signal alternating in high and low levels;

a first up-down counter for up and down counting a first and a second clock pulse when the frequency division outputs from said frequency dividing circuit are at the high and low levels, respectively, said first up-down counter to detect the unequal interval period among the angular position signals from the generator by comparing a time ratio of a previous period to a current period with a given value K;

a second up-down counter for up and down counting said first and second clock pulses when the frequency division outputs from said frequency dividing circuit are at the low and high levels, respectively, said second up-down counter to detect an unequal interval period among the angular position signals from the generator by comparing the time ratio of a previous period to a current period with a given value K;

a first resetting means for resetting said first up-down counter in response to a logical AND of an edge of the angular position signal of said generator and the output of said frequency divider;

a second resetting means for resetting said second up-down counter in response to a logical AND of an edge of said angular position signal and an inversion of the output of said frequency divider; and a reference position signal output circuit for outputting a reference position signal when at least one of said first and second up-down counter determines said period having unequal interval.

7. An apparatus for detecting a rotational angular position of an internal combustion engine, comprising:

an angular position signal generator for generating a pulse train having reference position information in an unequal interval period of said pulse train;

an up-down counter for up and down counting first and second clock pulses, respectively, in response to the pulse train from said generator to determine the reference position in the pulse train from the generator by comparing the time ratio of the previous pulse to the current pulse with a given value K; and a f/K frequency dividing circuit for generating a down count clock for said up-down counter in which frequency dividing clocks f/2 and f/3 are obtained by dividing the first clock pulse clock by 2 and 3, said down clock comprising said frequency dividing clocks f/2 and f/3 alternatively repeated n times and (N−n) times, respectively, wherein n and N are integers which satisfy the relation {2N+3(N−n)}/N=K.

8. An apparatus as defined in claim 7 in which said f/K frequency dividing circuit further comprises;

means for dividing the frequency f of the first clock pulse clock by 2 to generate a clock having a frequency of f/2;

means for dividing the frequency f of the first clock pulse clock by 3 to generate a clock having a frequency f/3;

clock selecting means connected with said f/2 and said f/3 clocks for generating a down count clock alternatively comprised of said f/2 and said f/3 clocks; and means for controlling said clock selecting means to generate said down count clock, said down count clock having frequencies f/2 and f/3 by means of said selecting means while (n−1) and (N−1) down count clocks are counted, respectively; and said means being reset by N down count clocks for generating the down count clocks which are alternated at said given period.

9. An apparatus as defined in claim 7 in which said f/K frequency dividing circuit further comprises;

a first counting circuit for consecutively generating first to third output pulse signals in response to a given number of up count clocks f;

a second counting circuit for consecutively generating and resetting a plurality of groups of output signals in response to a given number of said first output pulse signals which forms f/K down count clock;

an OR means for outputting a logical sum of output signals of a predetermined group of said plurality of groups; and signal switching means for resetting said first counting circuit and the output signal of said OR means and for resetting said first count circuit in response to the third output signal of said first count circuit and an inverted output of an output signal of said OR means.

10. An apparatus as defined in claim 9, wherein said OR means includes means for selecting an other group of output signals among said plurality of groups in lieu of said predetermined group to output the logical sum.

* * * * *